United States Patent [19]

Reef

[11] 4,335,518
[45] Jun. 22, 1982

[54] THREAD GAGING INSTRUMENT

[76] Inventor: Jan Reef, 41520 Eight Mile Rd., Northville, Mich. 48167

[21] Appl. No.: 235,592

[22] Filed: Feb. 18, 1981

[51] Int. Cl.³ .............................................. G01B 3/40
[52] U.S. Cl. ............................ 33/199 R; 33/147 M
[58] Field of Search ................ 33/199 R, 167, 147 M

[56] References Cited

U.S. PATENT DOCUMENTS 1,939,643  12/1933  Beardsley .................. 33/199 R
2,620,569  12/1952  Scrivener .................. 33/199 R

FOREIGN PATENT DOCUMENTS 28666   8/1930  Australia .................... 33/199 R
772118  4/1957  United Kingdom ......... 33/147 M Primary Examiner—Harry N. Haroian
Attorney, Agent, or Firm—Fisher, Gerhardt, Crampton & Groh

[57] ABSTRACT

An instrument for gaging external threads having a frame holding an anvil for supporting axially spaced points on a threaded member and a gaging element for gaging an opposed surface of the threaded member at a point substantially midway between the supported points. The single gaging element floats both radially and axially of the threaded member and the movements are indicated by separate dial indicators.

12 Claims, 6 Drawing Figures

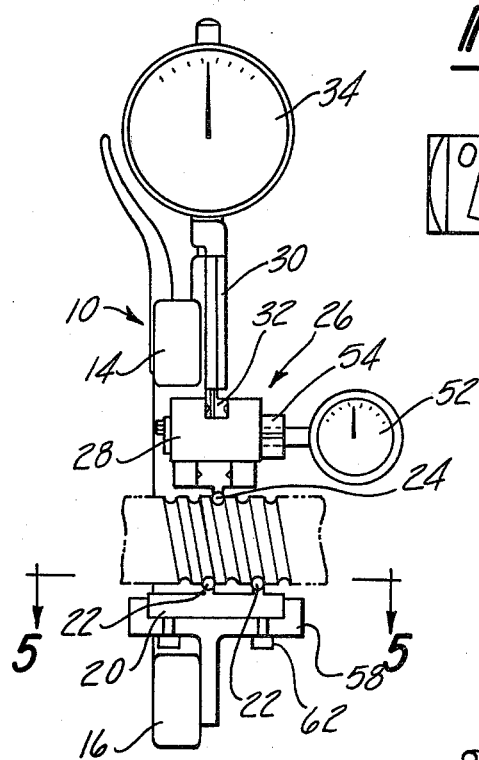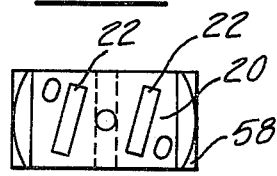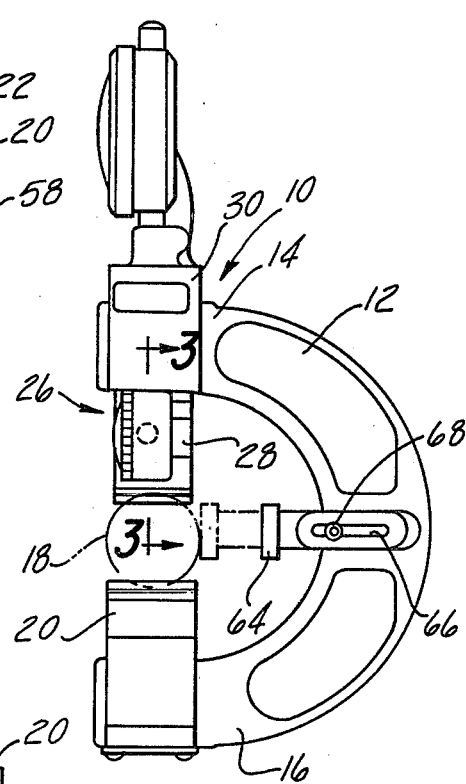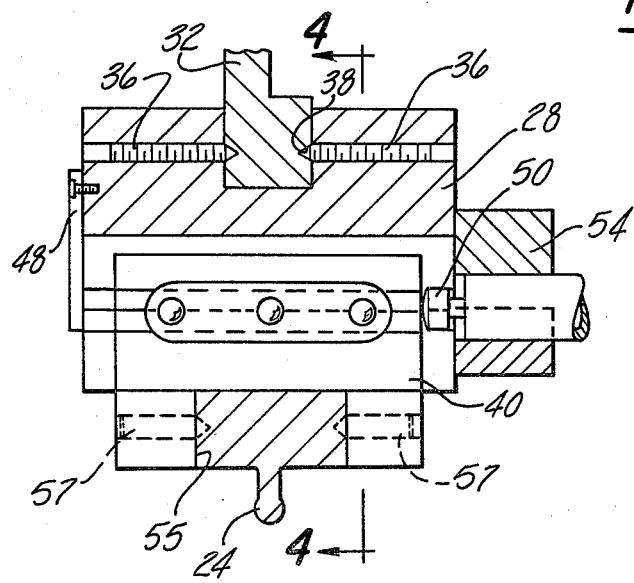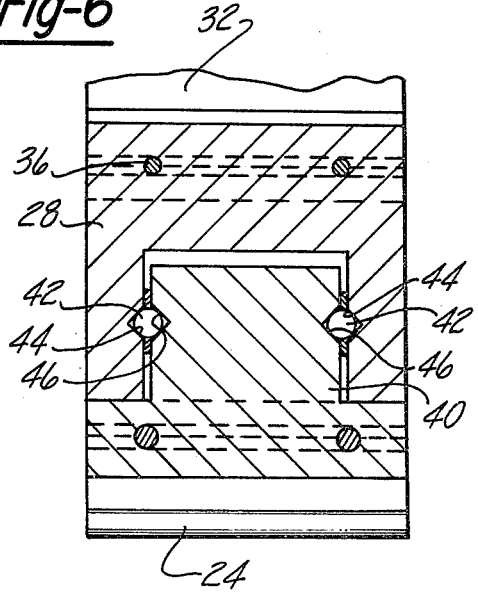

THREAD GAGING INSTRUMENT

This invention relates to thread gaging instruments and particularly to instruments for gaging the external threads on threaded members.

It is an object of the invention to provide a gage instrument for checking the external threads of screws in which the instrument has great versitility making it possible to check pitch diameter, lead drunkeness and other screw characteristics.

Another object of the invention is to provide a gage instrument in which the thread to be gaged is accurately seated through means of a floating gage head.

Another object of the invention is to provide a gage instrument which can be applied the threads as they are being formed.

Yet another object of the invention is to provide a gage instrument in which the anvil on which the threaded member to be gaged is seated can be readily pivoted to accommodate different thread leads.

A further object of the invention is to provide a gage instrument in which the anvil on which the threaded member is seated can be removed and used with a variety of instrument frames to gage threaded members of different diameters.

An instrument embodying the invention has a generally C-shaped frame including a pair of spaced arms one of which supports an anvil member with axially spaced seat elements engageable and axially spaced points on a threaded member to be gaged. The threaded member is pivotal about an axis intersecting the axis of the threaded member to be gaged to accommodate threads of different pitch. The other spaced arm supports a gage element which can move both radially and axially of the threaded member to be gaged and one indicator is supported to record the radial movement and another indicator is supported to indicate the axial movement of the gage element to thereby simultaneously gage pitch diameter, lead and drunkness.

A presently preferred embodiment of the invention is illustrated in the accompanying drawings in which:

FIG. 1 is a gage instrument embodying the invention in position relative to a threaded member to be gaged;

FIG. 2 is a side elevation of the gage instrument seen in FIG. 1;

FIG. 3 is an enlarged sectional view of a portion of the instrument seen in FIG. 1;

FIG. 4 is a cross-sectional view taken on line 4—4 in FIG. 3;

FIG. 5 is a top elevation of seat elements of the instrument; and

FIG. 6 is a side elevation of the structure seen in FIG. 5.

Referring to the drawings, the gage instrument is designated generally at 10 and includes a frame 12. The frame 12 is of a generally C-shaped configuration having a pair of spaced arms 14 and 16 which are spaced apart a sufficient distance to receive a threaded member 18 requiring gaging.

During gaging, the threaded member 18 is supported on an anvil member 20 fastened to the lower arm 16. The anvil 20 includes a pair of spaced seat elements 22 which in the illustrated embodiment of the invention are shaped to be complementary to the semi-circular spaces between adjoining threads of a ball-type threaded member 18.

During gaging, the threaded member 18 is supported on the seat element 22 which are shaped to fit in the space between threads and the diametrically opposed surface of the threaded member 18 is engaged by a gaging element 24 forming part of a gaging assembly designated generally at 26. The gaging assembly 26 is supported from the upper arm 14 and includes a body member 28 supported for limited vertical movement relative to the upper arm 14 by a structure including a housing 30 fastened to one side of the upper arm 14. The housing 30 supports a vertically movable blade member 32 and a dial indicator 34 of a type more fully disclosed in my U.S. Pat. No. 3,142,907, issued Aug. 4, 1964. The blade member 32 is supported for sliding movement within the housing 30 and is normally biased downwardly by a spring, not shown. Upward movement of the blade member 32 actuates the dial indicator 34 and in effect measures the amount of vertical displacement of the body member 28.

As seen in FIG. 3, the body member 28 is secured to the blade member 32 to move therewith by means of screws 36, the ends of which engage in V-shaped seats 38 formed at the lower end of the blade member 32. The body member 28 supports a slide member 40 for movement generally axially of the threaded member 18. The body member 28 is generally U-shaped as seen in FIG. 4 and receives the slide member 40 which is held in position by balls 42 disposed in complementary V-shaped channels 44 formed in the body member and 46 formed in the slide member 40. As viewed in FIG. 3, movement of slide member 40 to the left is limited by a plate 48 and movement of the slide member 40 to the right engages it with a stem 50 on a second dial indicator 52 clamped in position relative to the body member 28 by a split clamp 54 mounted on the side of the body member 28.

The slide member 40 supports the thread gaging element 24 which is adapted to be seated in a space between adjoining threads on the threaded member 18 which is to be gaged. The gaging element 24 as seen in FIG. 3 is removably secured in a way 55 formed in the slide member 40 by means of screws 57.

Anvil 20 with seat elements 22 is supported by a support bracket 58 fastened to the lower arm 16. Anvil 20 pivots around a dowel pin 60 as seen in FIGS. 5 and 6 so that it can be rotated a slight amount to selected positions. The axis of the dowel 60 is generally transverse to and bisects the axis of the threaded member 18 which is to be gaged. The rotating anvil 20 relative to support 58 makes it possible to move the seat elements 22 angularly to accommodate different thread leads. Once the desired thread lead is selected by means of a master gage block or plug, the anvil 20 can be held in the selected position by means of screws 62.

The spacing of the seat elements 22 preferably is an even multiple of the thread pitch. By spacing the seat elements 22 two, four or six times the thread pitch the disposition of the gaging element is established as substantially midway between the seat elements 22.

The frame 12 also is provided with a rest 64 disposed substantially midway between the upper arm 14 and the lower arm 16. The rest 64 is adjustable radially of the threaded member 18 through means of a slot 66 and screw 68 to engage one side of the threaded member during the gaging operation.

Gaging is accomplished by first adjusting the gaging instrument 10 by using a master gage block or plug to adjust the position of the anvil 20 and to adjust the dial indicators 34 and 52 to a zero position. Thereafter, gaging can be accomplished by placing the threaded member 18 in position on the seat elements 22 which will cause the gaging element 24 to come into engagement at the diametrically opposite side of the threaded member and in a space between adjoining threads. Because the body member 28 and therefore the gaging element 24 can move both vertically and horizontally, that is radially and axially of the threaded member 18, the gaging element 24 can be considered as floating and readily comes into alignment with the space between adjoining threads. This can be done by either manually placing the threaded member 18 relative to the instrument or by moving the instrument into position relative to a threaded member 18 while it is being formed and rotated. The dial indicator 34 will indicate pitch diameter and the dial indicator 52 will measure the accumulated lead depending on the number of revolutions of the threaded member 18 during the guiding operation. Any fluctuations or variations on the dial indicator 52 will serve to indicate drunkenness.

An instrument for gaging external threads on a threaded member has been provided in which the member to be gaged is disposed on axially spaced apart seat elements and a gaging element is brought into engagement with the threaded member at a diametrically opposed surface between adjacent threads and substantially midway between the seat elements. The gaging element floats to move both radially and axially of the threaded member and these movements are separately indicated by separate indicating means. The seat elements are formed on an anvil which may be pivoted to selected positions to accommodate threads with different leads.

The embodiments of the invention in which an exclusive property or privilege is claimed are defined as follows:

1. An instrument for gaging external threads on a threaded member, comprising: a generally C-shaped frame having a pair of spaced arms, an anvil member supported from one of said arms and having seat elements engageable with axially spaced points on said threaded member to support said threaded member for rotation relative thereto, said anvil member being pivotal to selected positions about an axis extending transverse to the axis of said screw to accommodate threads of different pitch, a gage element supported from the other of said pair of spaced arms in spaced relationship to said seat member for engagement between adjacent threads at a diametrically opposed surface of said threaded member for movement radially and axially of said threaded member, first indicator means to record radial movement of said gage element relative to said threaded member and second indicator means to record axial movement of said gage element relative to said threaded member.

2. The instrument of claim 1 wherein said seat elements are spaced apart an axial distance greater than the pitch of said threaded member.

3. The instrument of claim 1 wherein the spacing of said seat elements is an even multiple of the pitch of said threaded member.

4. The instrument of claim 1 wherein said anvil is removably and pivotally mounted from said one arm and means for locking said anvil in a selected position.

5. The instrument of claim 1 wherein said anvil is detachable and usable in a C-frame of a dimension to accommodate threaded members of a different dimension.

6. The instrument of claim 1 wherein supports are provided at circumferentially spaced locations on a threaded member by said seat elements, said gage element and a stop element positioned intermediate said arms, said elements being simultaneously engageable with said threaded member.

7. The instrument of claim 1 which is capable of being positioned with said gage element and seat elements on a threaded member while it is being rotated.

8. The instrument of claim 1 which is capable of being positioned with said gage element and seat elements on a threaded member while said threaded member is being rotated.

9. The instrument of claim 1 and further comprising a body member supported from said other of said pair of spaced arms for radial movement relative to a threaded member, a support member mounted on said body member for movement relative thereto and axially of said threaded member, said first indicating means being movable in response to movement of said body member and said second indicator means being movable in response to movement of said support member.

10. The instrument of claim 1 wherein said second indicating means is supported on said body member for movement therewith.

11. The instrument of claim 1 wherein said seat elements are spaced apart at substantially equal distances to opposite sides of said gage element.

12. An instrument for gaging external threads on a threaded member comprising: a generally C-shaped frame having a pair of spaced arms, a seat member supported on one of said arms, a gaging assembly supported on the other of said arms in spaced relation to said seat member to receive said threaded member, said gaging assembly including a body member supported for movement radially of the threaded member, a threaded engaging element supported from said body for movement axially of said threaded member, first indicator means supported from said frame to indicate the degree of radial movement of said body member, second indicator means on said body member to indicate the amount of axial movement of said thread engaging element, said seat member having a pair of seat elements spaced apart a distance greater than the pitch of said threaded member and axially spaced at substantially equal distances to opposite sides of said thread engaging member, said pair of seat elements being adjustable as a unit about an axis extending transversely to the axis of said threaded member to accommodate different pitch angles of said threaded member.

* * * * *